US008839390B2

(12) United States Patent
Zana et al.

(10) Patent No.: US 8,839,390 B2
(45) Date of Patent: Sep. 16, 2014

(54) GROUPING PERSONAL ACCOUNTS TO TAILOR A WEB SERVICE

(75) Inventors: Joshua C. Zana, Seattle, WA (US); David R. Reed, Seattle, WA (US); Matthew J. Pope, Seattle, WA (US); Shyam S. Habarakada, Seattle, WA (US); Boyd Cannon Multerer, Bellevue, WA (US); Nir Nice, Kfar Veradim (IL); Todd R. Manion, Seattle, WA (US); Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 13/042,817

(22) Filed: Mar. 8, 2011

(65) Prior Publication Data

US 2012/0233676 A1 Sep. 13, 2012

(51) Int. Cl.
*G06F 7/04* (2006.01)
*H04L 29/08* (2006.01)

(52) U.S. Cl.
CPC .............. *H04L 67/306* (2013.01); *H04L 67/02* (2013.01)
USPC .......................................................... 726/7

(58) Field of Classification Search
CPC ....... H04L 67/02; H04L 67/306; H04L 63/08; H04L 63/083; H04L 63/105
See application file for complete search history.

(56) References Cited

U.S. PATENT DOCUMENTS

| 5,470,080 | A | 11/1995 | Naka et al. |
| 6,523,041 | B1 * | 2/2003 | Morgan et al. ...................... 1/1 |
| 7,428,750 | B1 * | 9/2008 | Dunn et al. ........................ 726/8 |
| 7,620,901 | B2 * | 11/2009 | Carpenter et al. ............. 715/754 |
| 7,770,134 | B2 | 8/2010 | Evans et al. |
| 2003/0208754 | A1 * | 11/2003 | Sridhar et al. .................. 725/34 |
| 2005/0251690 | A1 * | 11/2005 | Kuno et al. .................... 713/189 |
| 2005/0278426 | A1 * | 12/2005 | Blagg ............................. 709/204 |
| 2006/0129642 | A1 * | 6/2006 | Qian et al. ..................... 709/205 |
| 2006/0168144 | A1 * | 7/2006 | Segan et al. ................... 709/219 |
| 2006/0235696 | A1 * | 10/2006 | Bennett ....................... 704/270.1 |
| 2007/0180501 | A1 * | 8/2007 | Yadav et al. ...................... 726/5 |
| 2008/0165176 | A1 | 7/2008 | Archer et al. |
| 2008/0242221 | A1 * | 10/2008 | Shapiro et al. ............... 455/3.06 |

(Continued)

FOREIGN PATENT DOCUMENTS

| KR | 1020060027226 A | 3/2006 |
| KR | 1020070043688 A | 4/2007 |
| KR | 1020100094021 A | 8/2010 |
| WO | 2007146763 A2 | 12/2007 |

OTHER PUBLICATIONS

Goldenberg, Sergio., "The Virtual TV Couch", Retrieved at <<http://dm.lcc.gatech.edu/~sgoldenberg/msproject/Design%20Document.pdf>>, Apr. 6, 2007, pp. 1-42.

(Continued)

*Primary Examiner* — Jeffrey Pwu
*Assistant Examiner* — Carlos Amorin
(74) *Attorney, Agent, or Firm* — Micah Goldsmith; Glen Johnson; Micky Minhas

(57) ABSTRACT

Grouping personal accounts to tailor a web service may be accomplished by grouping information from two or more personal accounts. In some embodiments, a personal account may include a set of persons. By grouping personal accounts, a service provider may tailor a web service to multiple people based on information about those people.

20 Claims, 8 Drawing Sheets

(56) References Cited

U.S. PATENT DOCUMENTS

| | | | |
|---|---|---|---|
| 2009/0099995 A1* | 4/2009 | Tzeng | 706/50 |
| 2010/0079676 A1 | 4/2010 | Kritt et al. | |
| 2010/0138491 A1* | 6/2010 | Churchill et al. | 709/204 |
| 2010/0255916 A1 | 10/2010 | Sioufi Filho | |
| 2011/0010231 A1* | 1/2011 | Price et al. | 705/14.14 |
| 2011/0040627 A1* | 2/2011 | Brewer et al. | 705/14.64 |
| 2011/0173683 A1* | 7/2011 | Roach | 726/4 |
| 2011/0231778 A1* | 9/2011 | Hoag et al. | 715/745 |
| 2011/0299545 A1* | 12/2011 | Karaoguz et al. | 370/401 |
| 2012/0124456 A1* | 5/2012 | Perez et al. | 715/200 |
| 2012/0135684 A1* | 5/2012 | Shrum et al. | 455/41.2 |
| 2012/0136658 A1* | 5/2012 | Shrum et al. | 704/231 |
| 2012/0136943 A1* | 5/2012 | Paul et al. | 709/206 |
| 2012/0222092 A1* | 8/2012 | Rabii | 726/4 |
| 2012/0271812 A1* | 10/2012 | Chung | 707/709 |
| 2012/0310747 A1* | 12/2012 | Calabria | 705/14.67 |

OTHER PUBLICATIONS

Pawar, et al., "Multiple Mice for Computers in Education in Developing Countries", Retrieved at <<http://citeseerx.ist.psu.edu/viewdoc/download?doi=10.1.1.70.2229&rep=rep1&type=pdf>>, International Conference on Information and Communication Technologies and Development, ICTD, May 2006, pp. 8.

Tse, et al., "SDGToolkit: A Toolkit for Rapidly Prototyping Single Display Groupware", Retrieved at <<http://www.google.co.in/url?sa=t&source=web&cd=1&ved=0CBYQFjAA&url=http%3A%2F%2Fsites.google.com%2Fsite%2Fedwardhtse2%2F02-sdgToolkit-Poster.CSCW02.pdf&ei=__4_3TIxGn4CEB9C6gMYP&usg=AFQjCNHINPDq_DCxO-OFFXd-I6nQ4ANCOA>>, Conference on Computer Supported Cooperative Work, 2002, pp. 3.

"International Search Report", Mailed Date: Sep. 25, 2012, Application No. PCT/US2012/027650, Filed Date: Mar. 5, 2012, pp. 9.

\* cited by examiner

GROUPING PERSONAL ACCOUNTS TO TAILOR A WEB SERVICE

BACKGROUND

Current account-authentication techniques permit web-enabled service providers to identify a particular person and thus, information about that person. Based on this information, a service provider may tailor a web service to the person. On learning that a particular person interacting with a shopping service is a 25-year-old male with a history of buying golf clubs, for example, a service provider may tailor the shopping service to present golf vacations, golf equipment, and general sporting goods. Current techniques, however, include numerous limitations when more than one person is consuming a web service.

SUMMARY

This document describes techniques for grouping personal accounts to tailor a web service. In some embodiments, multiple personal accounts are grouped, along with their respective information, effective to permit a web-enabled service provider to tailor a web service to multiple people at one time. Thus, a shopping service can be tailored to present products of interest to both a 25-year-old male interested in golf and a 23-year-old female interested in tennis, such as a golf-and-tennis vacation to a resort in Phoenix, Ariz.

This summary is provided to introduce simplified concepts for grouping personal accounts to tailor a web service, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for grouping personal accounts to tailor a web service are described with reference to the following drawings. The same numbers are used throughout the drawings to reference like features and components.

DETAILED DESCRIPTION

Overview

Figure 1:
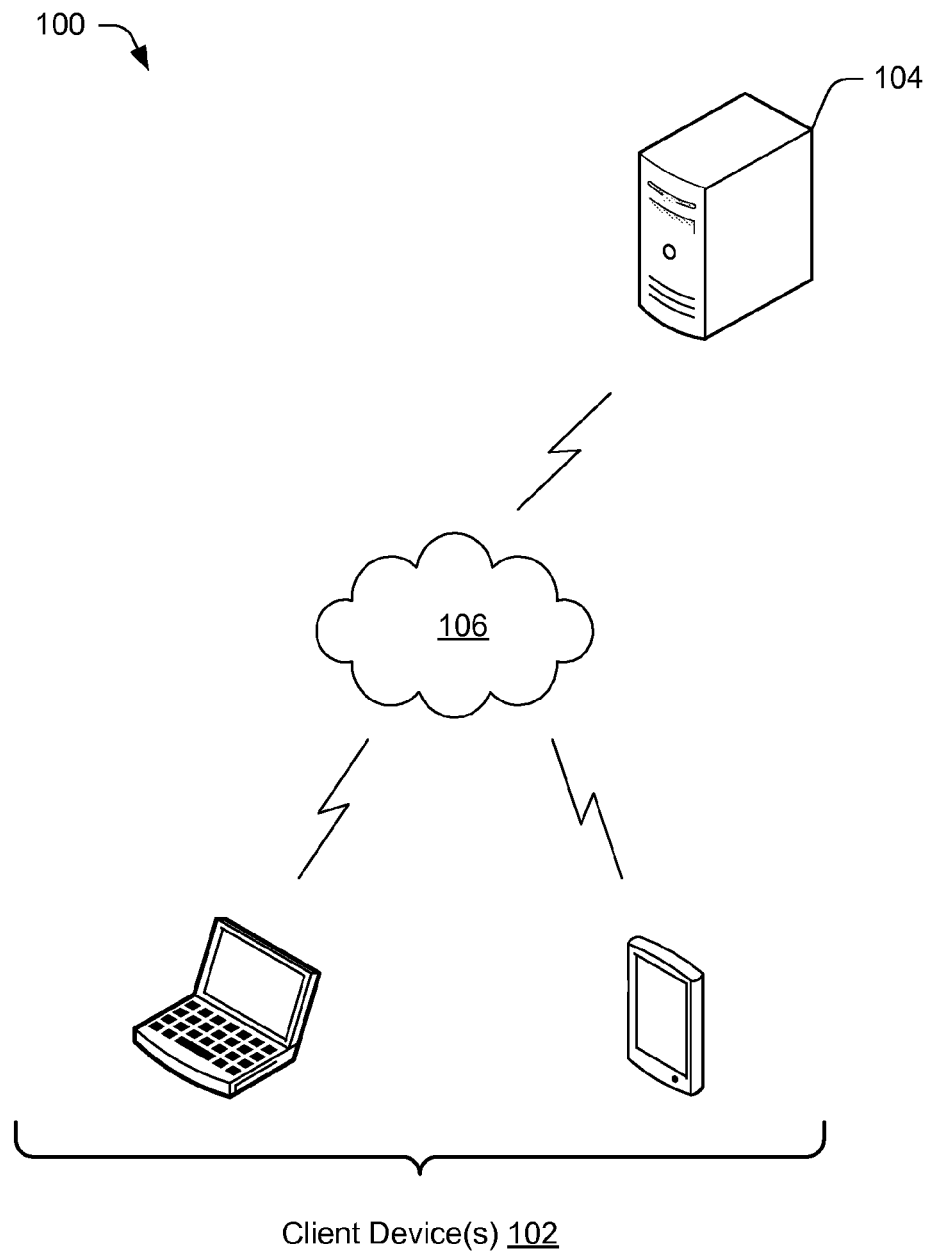
FIG. 1 illustrates an example environment in which techniques for grouping personal accounts to tailor a web service can be implemented.

This document describes grouping personal accounts to tailor a web service. By grouping personal accounts, even if this grouping simply associates information from multiple accounts, a service provider may tailor a web service to multiple people based on information about those people.

Consider a case where a family wishes to pick a movie to watch. Current techniques permit one member of the family to login to an account, assume here through a set-top box to view a media-selecting service through a television, and pick through movies presented by the service based on that one family member's preferences. Assume that a first parent logs in that likes western action movies. These are often not appropriate or wanted by children. Also assume that the second parent doesn't want to sit through Clint Eastwood's classic, The Good, The Bad, and The Ugly either. Similarly, if the second parent logs in instead, the service will present movies based on the second parent's preferences, such as romantic comedies and musicals. The kids probably won't want to watch these movies. The first parent probably won't sit through the romantic musical Gi Gi. Logging a child into the service, assuming the child even has an account, will likely be no better, as it will be very kid-oriented. To find a movie that the kids will like, that mom and dad may also like, probably requires browsing through tens if not hundreds of kid-oriented movies.

Techniques for grouping personal accounts to tailor a web service, however, enable the service provider to tailor the media-selecting service to everyone in the family. Assume here that the parents' preferences and the kids' preferences (either specific to an account or based on demographics for children) are used by the service provider to tailor the service. Based on all of these preferences, how they overlap, and the like, the family-tailored service presents the following three movie options: Paint Your Wagon, The Incredibles, and Avatar. Paint Your Wagon is PG, generally liked by older kids, has Clint Eastwood (though he sings in it), is a western, has some action, is a musical, and is considered a comedy as well. The Incredibles is about a whole family, is animated, is rated PG, is loved by most kids, is liked by many men and women, has action, superheroes, and child and adult-oriented comedy. Avatar has action, is often found to be liked by people that like westerns, is popular with older kids and adults, is computer generated, is PG-13, and has romantic elements as well. In this example the techniques permit three great choices for a whole family, rather than many choices through which to wade.

This is but one example of how the techniques for grouping personal accounts permit a web provider to tailor a web service—others are described below. This document now turns to an example environment in which the techniques can be embodied, after which various example methods for performing the techniques are described.

Example Environment

FIG. 1 is an illustration of an example environment 100 in which the techniques may operate to group personal accounts to tailor a web service. Environment 100 includes one or more client device(s) 102, a service-providing device 104, and a communication network 106. Client devices 102 are devices through which one or more users interact with a web service provided by service-providing device 104. Client devices 102 and service-providing device 104 interact through communication network 106, which may be the Internet, a local-area network, a wide-area network, a wireless network, a USB hub, a computer bus, or a combination of these.

Figure 2:
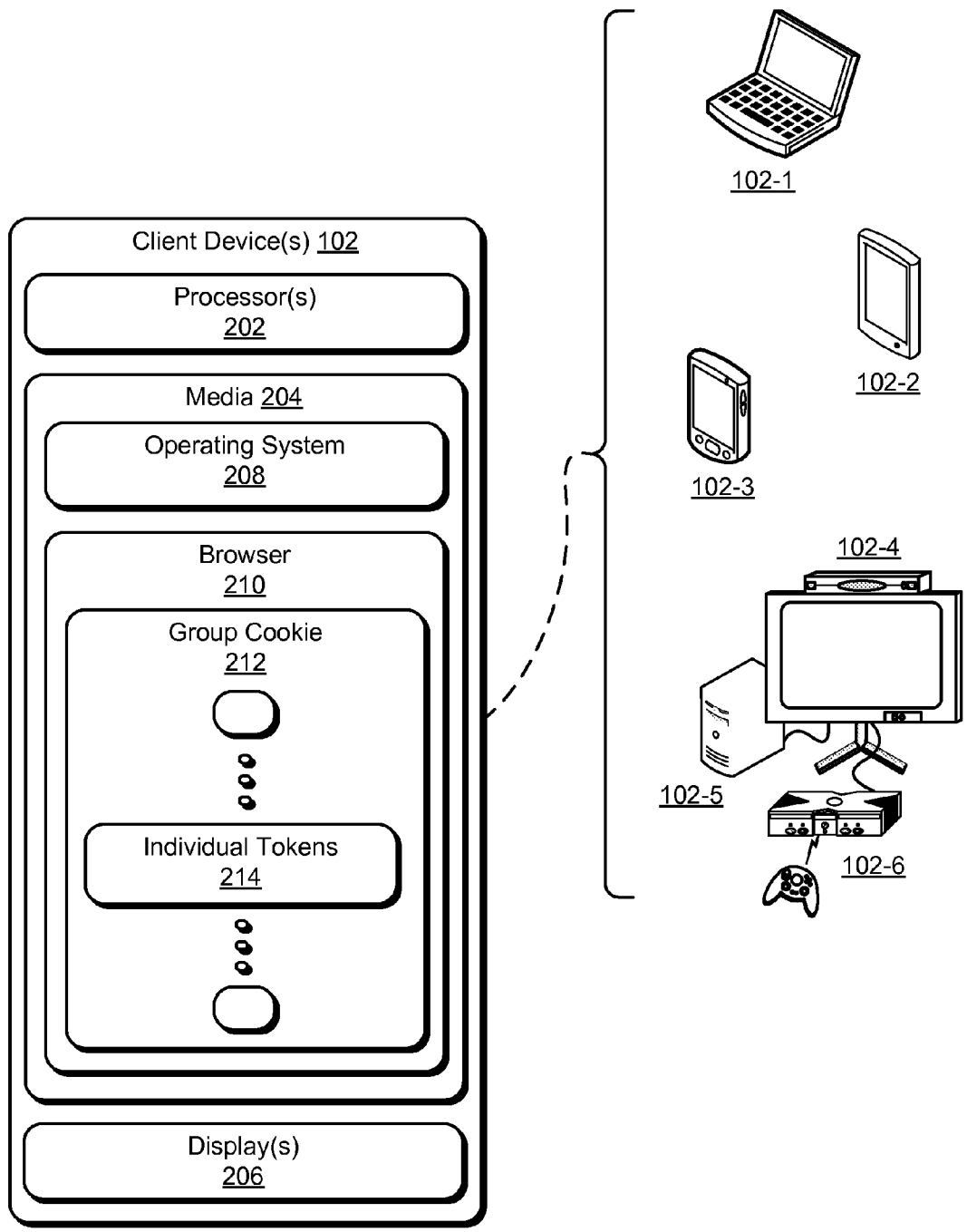
FIG. 2 is a more-detailed illustration of client devices illustrated in FIG. 1.

FIG. 2 is an illustration of an example embodiment of any of client devices 102. Client device 102 includes one or more processors 202, computer-readable storage media ("media") 204, and display(s) 206. Media 204 includes an operating system 208 and a browser 210. Browser 210 includes a group cookie 212 and one or more individual tokens 214. Group cookie 212, in some embodiments, includes individual tokens 214. Each of the individual tokens 214 is associated with a unique person or, in some cases, a set of persons. Thus, one token 214 may be associated with the first parent of the family described above, another token 214 with the Mom, and a still another token 214 with both children of that family. Each of these tokens 214 can be associated with information about each person or set of persons, such as through an account for each person having related preferences, history, demographic data, and the like.

As shown in FIG. 2, client device(s) 102 can each be one or a combination of various computing devices, here illustrated with six examples: a laptop computer 102-1, a tablet computer 102-2, a smart phone 102-3, a set-top box 102-4, a desktop computer 102-5, or a gaming device 102-6, though other computing devices and systems, such as servers and netbooks, may also be used.

Figure 3:
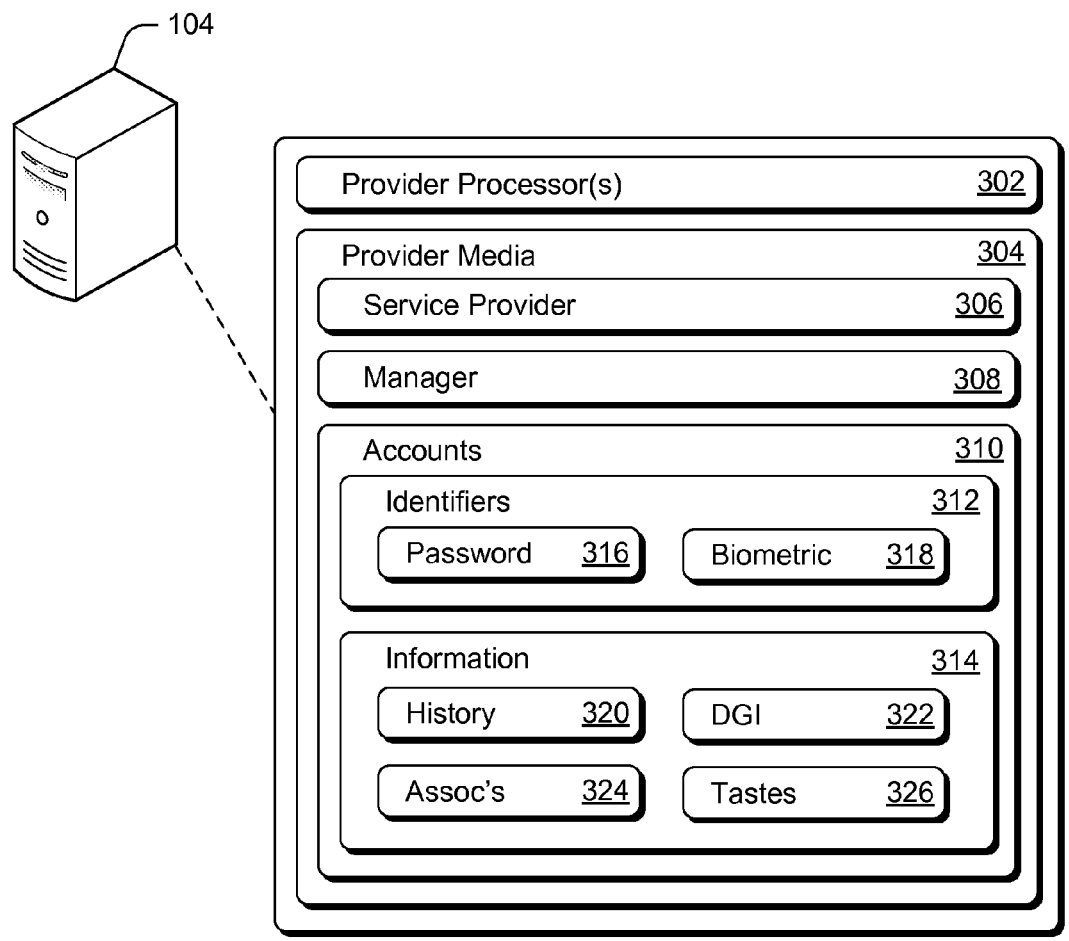
FIG. 3 is a more-detailed illustration of the service-providing device of FIG. 1.

FIG. 3 is an illustration of an example embodiment of service-providing device 104. Service-providing device 104 includes one or more provider processors 302 and provider computer-readable storage media ("provider media") 304. Media 304 includes or has access to a web-enabled service provider ("service provider") 306, a manager 308, and multiple accounts 310 each having one or more identifiers 312 and associated information 314. Example identifiers 312 include a password 316 and a biometric 318, though others may also or instead be used. Associated information 314, as noted in part above, can include a person's history 320 (e.g., purchasing golf clubs), demographic information (DGI) 322 (e.g., age, gender, income bracket, political affiliation, familial status), associations 324 (e.g., co-workers, friends, family members), and indicated tastes 326 (e.g., movies the person indicated that he or she liked, brands that he or she has expressed an interest, his or her favorite clothing store).

Web-enabled service provider 306 is capable of providing a web service tailored to multiple persons based on information 314 associated with multiple accounts 310 of these persons. Manager 308 is capable of securely grouping these multiple accounts 310 and indicating such groupings to service provider 306. In some embodiments, manager 308 provides individual tokens 214 and/or group cookie 212 (shown in FIG. 2) for use by service provider 306 in providing a web service to multiple individuals through one or more client devices 102. Manager 308 may also provide secure elevation of rights for one or more individuals of a group, such as to permit one individual of a group to purchase an item through the web service.

These and other capabilities, as well as ways in which entities of FIGS. 1-3 act and interact, are set forth in greater detail below. Note also that these entities may be further divided, combined, and so on. For instance, manager 308 may operate on a separate device having remote communication with service provider 306, such as residing on a separate server or on one of client devices 102. Manager 308 may also be internal or integrated with service provider 306, in which case manager 308's and service provider 306's actions and interaction may be internal to one entity. Thus, the environment 100 of FIG. 1 and the detailed illustrations of FIGS. 2 and 3 illustrate some of many possible environments capable of employing the described techniques.

Example Methods

Figure 4:
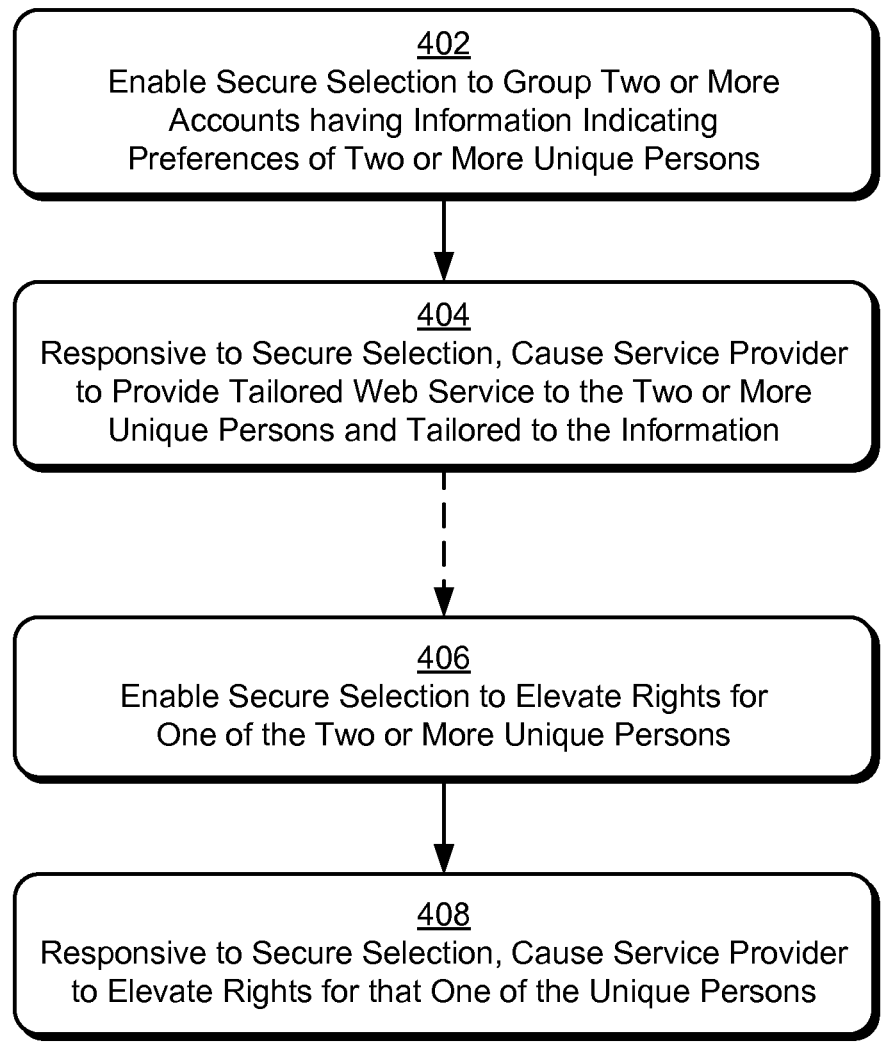
FIG. 4 illustrates an example method for grouping personal accounts to tailor a web service from the perspective of the manager of FIG. 3.

FIG. 4 depicts a method 400 for grouping personal accounts to tailor a web service from the perspective of manager 308. This method is shown as a set of blocks that specify operations performed but is not necessarily limited to the order shown for performing the operations by the respective blocks. In portions of the following discussion reference may be made to environment 100 of FIG. 1, reference to which is made for example only.

Block 402 enables secure selection to group two accounts, each of the accounts having information indicating preferences for unique persons associated with those accounts. This secure selection can be performed in various manners, such as by presenting, within an environment that is already secure, a selection to group accounts. Other example manners include enabling reception of a password or biometric for a unique person having one of those two accounts and then verifying that the password or biometric matches a record associated with one of those two accounts. This secure selection can be for two unique persons using one or multiple client devices 102.

Consider, by way of example, a case where one unique person has already securely logged into a web service and desires to add another person. Assume that this web service is a shopping website and that the first person (Lydia) is viewing a webpage on her desktop computer 102-5 at her home in Spokane, Wash. The webpage has various products one of which Lydia thinks her cousin Grace, who is currently on a smart phone 102-3 in Phoenix, Ariz., will love.

Figure 5:
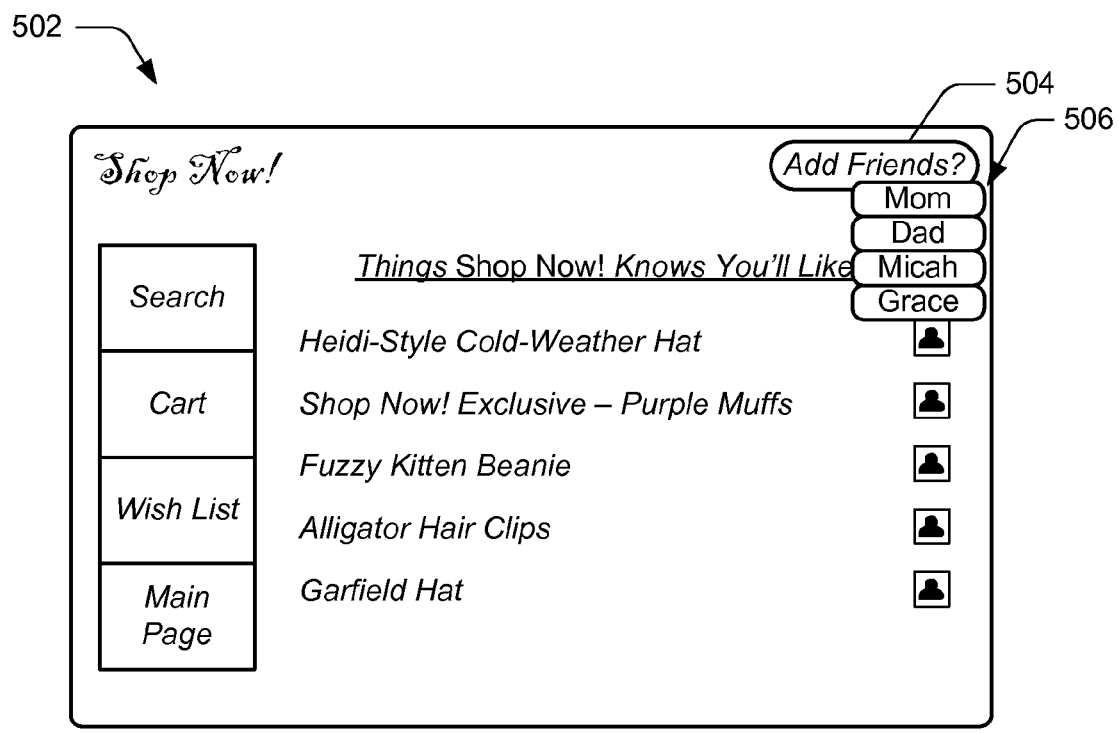
FIG. 5 illustrates an example web page of a shopping web service.

This webpage is illustrated in FIG. 5 at 502, and shows a shopping web service webpage as well as selectable control 504 indicating a choice to add another person. Assume that manager 308 presents this selectable control 504 directly or through service provider 306. The first person, Lydia, selects this control 504, in response to which manager 308 asks for the name or some identifier of the other person Lydia wishes to add. She indicates Grace's full name or, if Grace is already associated in some manner with Lydia (e.g., by being one of her associations 324), Lydia selects from a list or group of icons of associated persons 506, here including Mom, Dad, Micah, and Grace, for example. In response to selection of Grace by Lydia, manager 308 provides Grace with a selection to securely login to her account (if she has not already done so) and securely select to be associated with Lydia's shopping experience (not shown). Thus, manager 308 enables Grace to securely login and to securely select to be grouped with Lydia's shopping experience. After doing so, both Lydia and Grace are securely grouped by manager 308.

Block 404, responsive to secure selection, causes a web-enabled service provider to provide a tailored service to the first unique person and the second unique person, the tailored service tailored based on both the first information and the second information. Before continuing with the above example, this description addresses some general ways in which the techniques may operate.

Block 404, acting through manager 308, can cause service provider 306 to tailor a web service by providing an indication that two or more unique individuals have securely selected to group their accounts. This indication alone can be sufficient for service provider 306 to tailor the web service to those grouped accounts, such as by comparing information associated with those accounts. This indication can include tokens 114 associated with each of the persons. With these tokens 114, service provider 306 can create cookie 112 for use by one or more client devices 102, the cookie indicating the grouped accounts.

Continuing the ongoing example, after secure selection by Grace (and Lydia) to group their accounts for the shopping web service, manager 308 causes service provider 306 to present a tailored shopping web service to both Grace on her smart phone 102-3 and Lydia on her desktop computer 102-5. Note here that the tailoring of the web service can be extensive or not extensive. In this case the tailoring is primarily tailored to Lydia's information, either by selection or based on Lydia having begun shopping before adding Grace, and thus service provider 306 tailors the web service to both Lydia and Grace but keeps content of the web page viewed by Lydia rather than apply Grace's tastes (though that could be done). Instead, the tailoring is effective to create a web service that is tailored to both Lydia and Grace's information and is identical in appearance. Thus, the tailoring by service provider 306 alters Lydia's webpage based on information 314 associated with Grace's account 310, namely that Grace views only 2 items per webpage (due to size of her smart phone 102-3's display). Both Grace and Lydia now share a same web service experience tailored to both of them, here to Lydia's tastes and history and the Grace's display constraint. Now Lydia can know she is seeing what Grace sees, and thus when Lydia communicates with Grace she and Grace are certain that they are talking/messaging about the same item. This example is not limiting on the techniques—the web service could easily be altered such that both Lydia's and Grace's tastes, history, and the like are both used to tailor the web service, though in this case Lydia's content was determinative.

In some cases a tailored service may have limited rights available to one or more persons of the group, such as an ability to buy products through the web service. In such cases the method 400 may continue to blocks 406 and 408, though this is not required.

Block 406 enables secure selection to elevate rights for one of the two or more unique persons. This can be performed similarly to secure selection of group accounts, though it does not have to be. Manager 308, for example, can permit each of the unique persons of the group to select to elevate rights through entry and verification of identifier 312, such as password 316 or biometric 318, though they are not necessarily the same as used to select to group the accounts at block 402. If communications are secure for all unique persons of the group, selection to elevate rights may be performed by assent of all of the unique persons—such as to change a setting on the web service, which, while possibly not permitted by one person, can be selected or assented to by all of the persons.

In cases where it is not immediately known which person selected to elevate rights, manager 308 enables selection by the persons to indicate which selected to elevate his or her rights. This selection by one of the persons can be through entry and verification of an identifier or based on selection made through a client device 102 assumed to be accessible only to that person, for example.

Block 408, responsive to secure selection to elevate rights, causes the web service to elevate rights of that unique person. Block 408 may do so through a direct or internal instruction to service provider 306, such as one indicating that the person's selection was securely made and verified.

Continuing the ongoing example of Lydia and Grace, consider the case where the tailored web service does not permit either Lydia or Grace to buy a product without selection to elevate rights. By way of background to the example, assume that service provider 306 has indicated to manager 308 that enabling purchasing requires a rights elevation having a unique password or biometric different from the one used to group the accounts and verification of same. In such a case, manager 308, through service provider 306 and Grace's browser 210, presents a selectable control or responds to an attempt to purchase an item.

Assume also that Lydia was correct that Grace would love an item on the shopping site. Grace determines to buy the item (Alligator Hair Clips) and selects the control or selects to purchase the item. Service provider 306, through browser 210 and acting in conjunction with manager 308, then presents a data entry field for entry of a second password different from the password used by Grace to login in and/or select to be grouped with Lydia. Grace enters this password. Manager 308 verifies that this password is correct for Grace's account 310, and then indicates that the elevation of rights is approved to service provider 306 thereby causing service provider 306 to permit Grace to select to purchase the item (e.g., with her credit card that is on record in her account 310).

Method 400 can be performed multiple times, such as to group additional accounts. In such cases service provider 306 tailors the web service to the additional persons. These other persons do not necessarily have unique accounts, such as when two children of a family are added to the group. Thus, one account may be used for both children.

Figure 6:
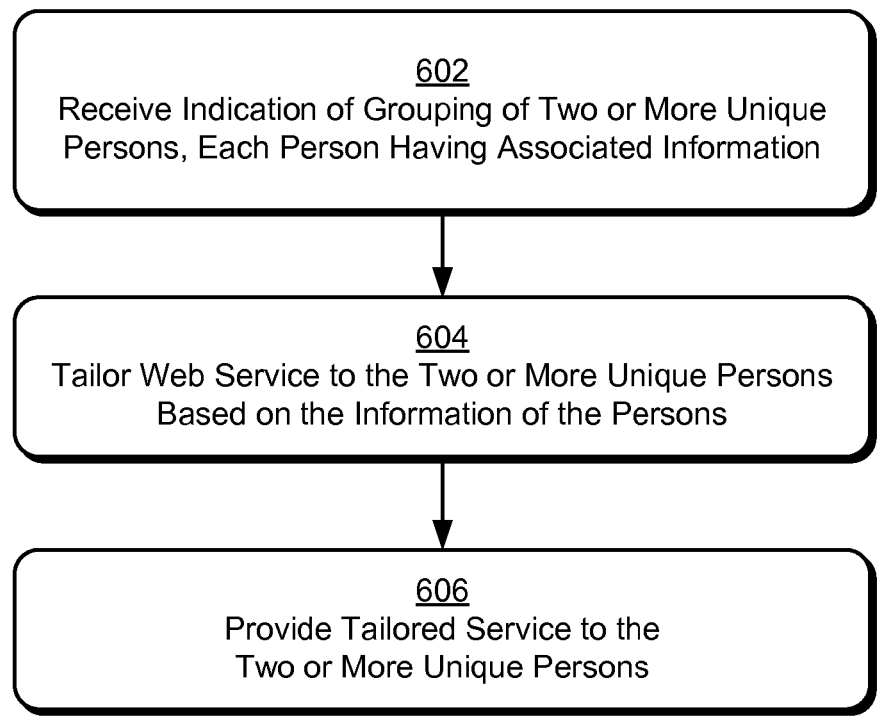
FIG. 6 illustrates an example method for grouping personal accounts to tailor a web service from the perspective of the service provider of FIG. 3.

FIG. 6 depicts a method 600 for grouping personal accounts to tailor a web service generally from the perspective of service provider 306. This method is shown as a set of blocks that specify operations performed but is not necessarily limited to the order shown for performing the operations by the respective blocks. In portions of the following discussion reference may be made to environment 100 of FIG. 1, reference to which is made for example only.

Block 602 receives an indication of a grouping of two or more unique persons, each of the unique persons having his or her own information. This indication can be responsive to selection, secure or not secure, by the unique persons to be grouped. As noted in part above, this indication can be received from another entity, such as manager 308 and by service provider 306, or be internal to service provider 306. Such an indication may be responsive to the unique persons all logging into the web service, selecting to be grouped, and/or in various other manners described above.

By way of example, consider again the example family and media-selecting service described above. Here assume that manager 308, through browser 210 on a single set-top box 102-4, presents multiple account logins for the dad, mom, and one for the kids. Assume that manager 308 securely logs in all three accounts and determines that, because all logged in through a same user interface and device, an implicit selection to be grouped. Manager 308 then creates individual tokens 214 of FIG. 2 for each of the three accounts 310, and passes these to service provider 306. Service provider 306 receives these tokens 214 and some indication that they are grouped (either cookie 212 having all three tokens 214 or otherwise).

Block 604 tailors a web service to the two or more unique persons based on the information of the unique persons. Various ways in which a service provider, such as service provider 306, tailors a web service are described elsewhere herein, such as based on history 320, demographic information 322, associations 324, and tastes 326.

Continuing the ongoing example, assume that service provider 306 tailors the media-selecting service based on the children's demographics, namely that based on their ages only G-rated and PG-rated movies and television programs are permitted, tastes selected by the parents (one selected a preference for musicals and the other rated westerns watched highly), and history of movies and television watched by all of mom, dad, and the kids. In such a case two of the above-mentioned movies would rise to the top (not Avatar due to its PG-13 rating), as well as numerous television programs.

Block 606 provides the tailored web service to the two or more unique persons. As noted above, this can be through multiple client devices 102. In the ongoing example, however, the tailored web service is a media-selecting service displayed on a television through set-top box 102-4. In this example service provider 306 provides group cookie 212 to browser 210 on set-top box 102-4, the cookie having three tokens 214, one for each of dad's, mom's, and the kids' account. Browser 210 can use this cookie in communicating with service provider 306.

Method 600 may conclude with block 606 or continue, such as to permit elevation of rights similarly to blocks 406 and 408 of method 400. Thus, dad may elevate his rights to permit selection (and consumption) of Avatar thereby overriding the parental controls prohibiting PG-13 programs. Or mom may elevate her rights to purchase an item displayed through the media-selecting service, such as one that requires a separate fee. Here elevation of rights is limited to a single exercise of a right, in this case to override or purchase media.

Concluding this example, mom elevates rights, purchases Paint Your Wagon after which service provider 306 provides the media, which is then consumed on a television display using browser 210 of set-top box 102-4.

Figure 7:
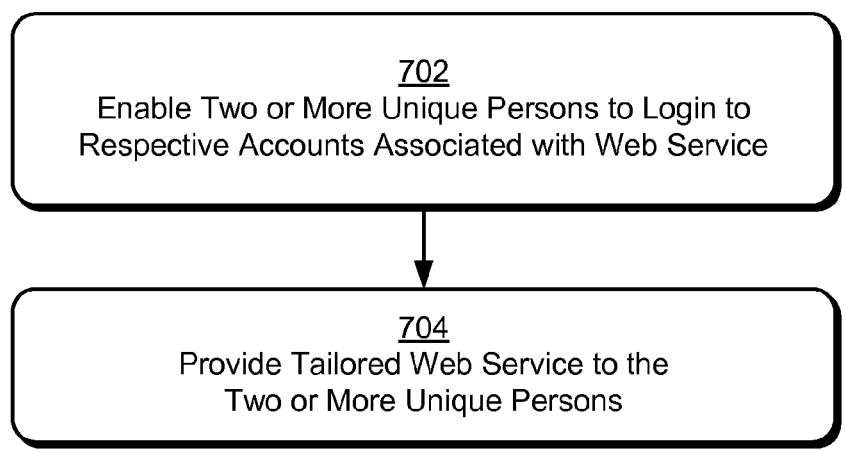
FIG. 7 illustrates an example method for grouping personal accounts to tailor a web service from the perspective of an entity capable of grouping of accounts and providing a tailored web service.

FIG. 7 depicts a method 700 for grouping personal accounts to tailor a web service from the perspective of an entity capable of grouping of accounts and providing a tailored web service. This method is shown as a set of blocks that specify operations performed but is not necessarily limited to the order shown for performing the operations by the respective blocks. In portions of the following discussion reference may be made to environment 100 of FIG. 1, reference to which is made for example only.

Block 702 enables two or more unique persons to login to respective accounts associated with a web service, the logins explicitly or implicitly indicating grouping of the two or more unique persons. By way of example, consider block 702 performed by service provider 306 having an integral manager 308. In such a case, service provider 306 enables login by the two or more unique persons.

Assume, for example, that service provider 306 provides a gaming web service. Also assume that service provider 306 enables, in conjunction with browser 210 of gaming device 102-6, secure login through browser 210 on one of displays 206 associated with gaming device 102-6. Here assume that two friends want to play against remote competitors, the two friends using the same client device (gaming device 102-6) at the same time. Assume also that each of the two friends has an account associated with the gaming web service, each of the accounts having information relating to each of them. This information indicates, for one of the friends, non-default settings for his game controller, a particular avatar that he uses, a particular game perspective (e.g., top down, 3D, or viewed from avatar's perspective), and a preferred game entity (e.g., a sniper or tank driver, wizard or swordsman). Likewise, the other friend has various preferences indicated by his information, such as a preferred game entity, game perspective, avatar, and the like. Service provider 306 enables both friends to login to their respective accounts and then groups their accounts.

Block 704 provides a tailored web service to the two or more unique persons, the tailored web service tailored to preferences of at least two of the two or more unique persons. This can be performed in various manners as described above.

In the ongoing example, service provider 306 begins a game tailored to both friends' preferences based on their associated information. Thus, service provider 306 may determine how to tailor the gaming web service to best meet both friends' preferences. Assume that there is no conflict for many of the preferences, but that one player often plays the game with a top-down perspective while the other friend always plays with the avatar's perspective. Service provider 306 determines that the gaming web service is best tailored to the avatar's perspective for both friends based on some tie-breaking algorithm, such as it being a default setting, it sometimes being used by both separately, or it being used by the friend that has less experience with the game. Concluding this example, service provider 306 provides the game web service tailored to both friends, which both friends then play.

Method 700 may continue in various manners set forth above, such as to elevate rights or add additional unique persons and re-tailoring to those persons.

The preceding discussion describes methods relating to grouping personal accounts to tailor a web service. Aspects of these methods may be implemented in hardware (e.g., fixed logic circuitry), firmware, software, manual processing, or any combination thereof A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in environment 100 of FIG. 1 including as detailed in FIG. 2 or 3, and/or example device 800 described below, which may be further divided, combined, and so on. Thus, environment 100 and/or device 800 illustrate some of many possible systems or apparatuses capable of employing the described techniques. The entities of environment 100 and/or device 800 generally represent software, firmware, hardware, whole devices or networks, or a combination thereof In the case of a software implementation, for instance, the entities (e.g., service provider 306 and manager 308) represent program code that performs specified tasks when executed on a processor (e.g., provider processor(s) 302). The program code can be stored in one or more computer-readable memory devices, such as provider media 304 or computer-readable media 814 of FIG. 8.

Example Device

Figure 8:
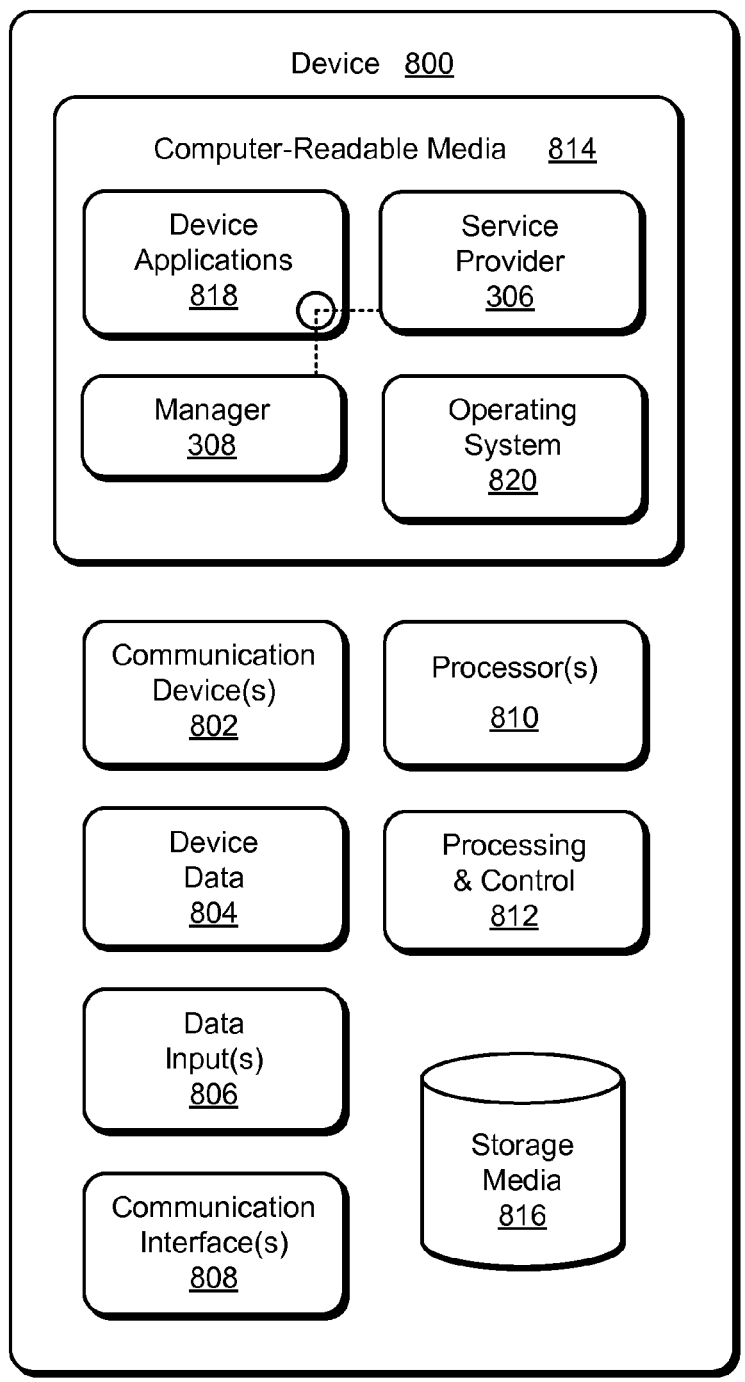
FIG. 8 illustrates an example device in which techniques for grouping personal accounts to tailor a web service can be implemented.

FIG. 8 illustrates various components of example device 800 that can be implemented as any type of client, server, and/or computing device as described with reference to the previous FIGS. 1-7 to implement techniques for grouping personal accounts to tailor a web service. In embodiments, device 800 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a user (e.g., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as human utterances, user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for grouping personal accounts to tailor a web service. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components, engines, or modules to implement techniques for grouping personal accounts to tailor a web service. In this example, the device applications 818 can include service provider 306 and manager 308.

Conclusion

Although embodiments of techniques and apparatuses for grouping personal accounts to tailor a web service have been described in language specific to features and/or methods, it is to be understood that the subject of the appended claims is not necessarily limited to the specific features or methods described. Rather, the specific features and methods are disclosed as example implementations for grouping personal accounts to tailor a web service.

What is claimed is:

1. A method implemented at a device, the method comprising:

enabling secure selection to group a first account with a second account by a first unique person or a second unique person via a selectable control of the device, the first account of the first unique person having first information indicating preferences of the first unique person the second account of the second unique person having second information indicating preferences of the second unique person; and responsive to secure selection by the first unique person or the second unique person via the selectable control of the device, causing a web-enabled service provider to provide a tailored web service to the first unique person and the second unique person via a group cookie comprising individual tokens corresponding to the first unique user and the second unique user, the tailored web service being tailored based, at least in part, on both the first information and the second information.

2. The computer-implemented method as described in claim 1, wherein the tailored web service has limited rights for the first unique person or the second unique person, and further comprising:

enabling secure selection, by the first unique person or the second unique person, to elevate rights for one of the first or second unique persons to purchase an item or service via the tailored web service; and responsive to secure selection to elevate rights, causing the web-enabled service provider to elevate rights for the first unique person or the second unique person.

3. The computer-implemented method as described in claim 2, wherein enabling secure selection to elevate rights includes enabling reception of a password or biometric identifier and verifying that the password or the biometric identifier matches a record associated with the first unique person or the second unique person.

4. The computer-implemented method as described in claim 1, wherein enabling secure selection to group the first account with the second account includes enabling reception of an identifier and verifying that the identifier matches a record associated with the first or second unique person.

5. The computer-implemented method as described in claim 1, wherein enabling secure selection to group the first account with the second account includes enabling:

secure login of the first unique person;
secure selection by the first unique person to group with the second unique person;
secure login of the second unique person; and
secure selection by the second unique person to group with the first unique person.

6. The computer-implemented method as described in claim 1, wherein enabling secure selection is performed through two, disparate client computing devices associated with the first and second unique persons, respectively.

7. The computer-implemented method as described in claim 1, wherein enabling secure selection to group the first account with the second account determines that the first unique person logged into the first account through a same user interface or through a same client computing device as that through which the second unique person logged into the second account.

8. The computer-implemented method as described in claim 1, further comprising:
enabling selection to group a third account associated with a unique person or group or class of unique persons with the first account and the second account; and
responsive to selection to group the third account, causing the web-enabled service provider to alter the tailored web service based on information associated with the third account.

9. The computer-implemented method as described in claim 1, wherein causing the web-enabled service provider to provide the tailored web service sends, to the web-enabled service provider, a first individual token associated with the first account and a second individual token associated with the second account.

10. The computer-implemented method as described in claim 1, further comprising, prior to causing the web-enabled service provider to provide the tailored web service, resolving a conflict between the first information and the second information such that one of the first information or the second information takes precedent over the other of the first information or the second information.

11. A method implemented at a device, the method comprising:
receiving, via a selectable control of the device, a selection from at least one of two or more unique persons to add another of the two or more unique persons to a group, each of the unique persons having his or her own information, the selection being verified via a first password;
tailoring a web service to the two or more unique persons based on the information of the unique persons and the received selection to add the another of the two or more unique persons to the group;
providing the tailored web service to the two or more unique persons; and
enabling the at least one of two or more unique persons to purchase an item or service from the tailored web service responsive to receiving verification of a second password, the second password being different from the first password.

12. The computer-implemented method as described in claim 11, wherein the tailored web service is provided to both of the two or more unique persons through a single client device.

13. The computer-implemented method as described in claim 11, wherein the web service is provided to the two or more unique persons through two or more disparate, client devices, each of the disparate, client devices associated with one or more of the two or more unique persons.

14. The computer-implemented method as described in claim 11, further comprising:
receiving selection to elevate rights from one of the two or more unique persons, the selection having an associated identifier;
responsive to the selection:
providing the associated identifier to a manager; and
receiving from the manager a verification or lack of verification; and
responsive to receiving the verification, elevating rights of the unique person with which the verification is associated; or
responsive to receiving the lack of verification, not elevating rights of the unique person.

15. The computer-implemented method as described in claim 14, wherein elevating rights limits the elevated right to a single exercise of the elevated right.

16. The computer-implemented method as described in claim 11, wherein providing the tailored web service is through two or more browsers on two or more client devices.

17. A method implemented at a device, the method comprising:
enabling two or more unique persons to login to respective accounts associated with a web service, the logins of at least two of the two or more unique persons explicitly or implicitly indicating grouping of the at least two of the two or more unique persons via a selection made in conjunction with the login; and
providing, by the device, a tailored web service to each of the at least two of the two or more unique persons based, at least in part, on the at least two of the two or more unique persons being grouped via the selection made in conjunction with the login, the tailored web service tailored to preferences of each of the at least two of the two or more unique persons.

18. The computer-implemented method as described in claim 17, wherein the tailored web service does not include an elevated right and further comprising enabling the elevated right for one of the two or more unique persons responsive to secure selection of the elevated right via a different password from a password used to login by the one of the two or more unique persons.

19. The computer-implemented method as described in claim 18, wherein enabling the elevated right includes:
receiving selection of an action requiring the elevated right;
enabling selection by the two or more unique persons to indicate which one of the two or more unique persons made the selection of the action; and
receiving the selection indicating which one of the two or more unique persons made the selection of the action.

20. The computer-implemented method as described in claim 18, wherein the selection indicating which one of the two or more unique persons made the selection of the action receives and verifies an identifier, the identifier not used as part of the login by the one of the two or more unique persons that made the selection of the action.

* * * * *